(12) United States Patent
Lee

(10) Patent No.: US 6,802,610 B2
(45) Date of Patent: Oct. 12, 2004

(54) IMAGE PROJECTOR

(75) Inventor: Seung Gyu Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/026,541

(22) Filed: Dec. 27, 2001

(65) Prior Publication Data

US 2002/0085180 A1 Jul. 4, 2002

(30) Foreign Application Priority Data

Dec. 28, 2000 (KR) .......................................... 2000-84712

(51) Int. Cl.⁷ .............................................. G03B 21/14
(52) U.S. Cl. ........................................... 353/20; 102/81
(58) Field of Search ............................ 353/20, 31, 33, 353/34, 37, 38, 102, 81, 84; 349/5, 8, 9; 348/742, 743, 77

(56) References Cited

U.S. PATENT DOCUMENTS

| | | | | |
|---|---|---|---|---|
| 5,517,340 A | * | 5/1996 | Doany et al. .................. 349/5 |
| 5,552,840 A | * | 9/1996 | Ishii et al. ................... 348/751 |
| 5,863,125 A | * | 1/1999 | Doany .......................... 353/84 |
| 5,884,991 A | * | 3/1999 | Levis et al. .................. 353/122 |
| 5,984,478 A | * | 11/1999 | Doany et al. ................. 353/84 |
| 6,005,722 A | * | 12/1999 | Butterworth et al. ....... 359/712 |
| 6,036,318 A | * | 3/2000 | Itoh ............................ 353/20 |
| 6,266,105 B1 | * | 7/2001 | Gleckman ................... 348/743 |
| 6,343,862 B1 | * | 2/2002 | Sawai et al. ................... 353/1 |
| 6,343,864 B1 | * | 2/2002 | Tajiri .......................... 353/20 |
| 6,398,368 B2 | * | 6/2002 | Chen ........................... 353/98 |
| 6,497,485 B1 | * | 12/2002 | Itoh ............................ 353/20 |
| 6,547,396 B1 | * | 4/2003 | Svardal et al. ................ 353/8 |
| 6,597,409 B1 | * | 7/2003 | Shioya et al. .............. 348/743 |
| 6,642,969 B2 | * | 11/2003 | Tew .......................... 348/743 |
| 2002/0180933 A1 | * | 12/2002 | Ito ............................. 353/20 |

FOREIGN PATENT DOCUMENTS

| | | |
|---|---|---|
| EP | 0 848 274 | 6/1998 |
| EP | 0980188 A2 | 2/2000 |
| EP | 0 991 281 | 4/2000 |
| EP | 1024670 A2 | 8/2000 |
| JP | 2000028960 | 1/2000 |
| JP | 200034723 | 12/2000 |
| WO | WO98/18040 | 4/1998 |

* cited by examiner

Primary Examiner—William C. Dowling
(74) Attorney, Agent, or Firm—Fleshner & Kim, LLP

(57) ABSTRACT

Image projector including a lamp for emitting beams of lights, a color wheel for splitting particular color beams in succession from the beams of lights, a rod lens for making distribution of the color beams from the color wheel uniform, a polarized beam converter for converting the color beams into beams of a particular pole, an optical system for focusing the color beams converted into beams of a particular pole, a display for producing a picture beam of a video signal according to the video signal by using the color beams from the optical system, a polarization beam sprite prism between the optical system and the display for reflecting the color beams from the optical system and transmitting the picture beams from the display, and a projection lens for enlarging, and projecting the picture beams.

14 Claims, 15 Drawing Sheets

IMAGE PROJECTOR

This application claims the benefit of the Korean Application No. P2000-84712 filed on Dec. 28, 2000, which is hereby incorporated by reference.

BACKGROUND OF THE INVENTION

1. Field of the Invention

The present invention relates to an image projector.

2. Background of the Related Art

The projector enlarges, and projects a small picture formed on a small display inside of the image projector by using a projection lens to a large sized screen, to display a large sized picture. In the image projector, there are a front projection type in which the picture is displayed on a front face of the screen, and a rear projection type in which the picture is displayed on a rear face of the screen. As a typical example of the latter, there is the projection television. As the small display in the image projector that displays the small picture, LCD (Liquid Crystal Display) and DMD (Digital Micromirror Device), and the like are employed. The LCD is provided with a polarized beam converter for displaying the picture by using a linearly polarized light.

FIG. 1 illustrates a related art image projector, FIG. 2 illustrates an operation of the polarization beam sprite array in the image projector in FIG. 1, FIGS. 3A and 3B illustrate operation of the image projector in FIG. 1, FIGS. 4A and 4B illustrate operation of the polarization beam sprite prism in the image projector in FIG. 1, and FIG. 5 illustrates a lamp with an elliptic reflector.

Referring to FIG. 1, the related art image projector is provided with a lamp 1 for emitting beams of lights, a parabolic reflector 2 for reflecting the beams to forward of the lamp 1, and a polarized beam converter for transmitting an 'S' wave, and converting 'P' wave into 'S' wave and transmitting the converted 'S' wave among the beams from the parabolic reflector 2.

The related art image projector also provided with first to third illumination lenses 10, 12, and 14 for focusing the beams polarized into a particular pole (i.e., the S wave) at the polarized beam converter, a color switch 16 for transmitting only a particular beam among the beams from the third illumination lens 14, and a polarization beam sprite prism 18 for supplying a particular color beam from the color switch 16 to a display 22, and the beam reflected at the display 22 to a projection lens 20.

The display 22 displays a picture by reflecting the color beam from the polarization beam sprite prism 18 in response to a video signal, and the projection lens 20 enlarging the beam of the picture from the display 22, and projects to a screen at a distance.

The beams of lights from the lamp 1 are incident on the polarized beam converter by the parabolic reflector 2. The polarized beam converter transmits the S wave, and converts and transmits P wave among the beams from the parabolic reflector 2. To do this, the polarized beam converter is provided with a first lens array 4, a second lens array 6, and a polarization beam sprite array 8 facing a light output surface of the second lens array 6.

The first lens array 4, or the second lens array 6 focuses the beams of light including the P wave and the S wave to a plurality of focusing points. To do this, the first, or second lens array 4, or 6 has a matrix of a plurality of lenses.

The polarization beam sprite array 8 transmits 'S' wave, and converts the P wave into the S wave, and transmits the converted S wave, both from the second lens array 6. To do this, the polarized beam sprite array 8 is provided with polarized beam split planes 24 and reflection planes 26 both sloped with respect to the optical output surface, and half wavelength plates 28 attached to optical output surface of the polarized beam split planes 24 as shown in FIG. 2.

The polarized beam split plane 24 transmits only the P wave and reflects the S wave among the white beams from the second lens array 6. The P wave transmitted through the polarized beam split plane is converted into an S wave by the half wavelength plate 28. On the other hand, the S wave reflected at the polarized beam split plane 24 is reflected at the reflection plane 26 and forwarded as it is. That is, the entire beam of light including the P wave and the S wave passed through the polarization beam sprite array 8 is converted into the S wave.

The beam converted into the S wave at the polarized beam converter are incident on the first to third illumination lenses 10, 12, and 14 in succession. The first to third illumination lenses 10, 12, and 14 focus the beams converted into the S wave onto the color switch 16.

The color switch 16 splits red, green, and blue colors in succession so that one display cell has red, green, and blue colors in common. To do this, the color switch 16 filters a particular color beam according to a change of a voltage signal supplied from a voltage supply part (not shown). In this instance, the color beams passed through the color switch 16 are converted into the P wave from the S wave, and incident on the polarization beam sprite prism 18.

The P wave color beam from the color switch 16 to the polarization beam sprite prism 18 transmits a split plane 30 in the polarization beam sprite prism 18, and incident on the display 22.

The display 22 reflects the P wave color beam transmitted through the polarization beam sprite prism 18 according to a video signal, to produce a picture beam with picture information. In this instance, as shown in FIG. 3A, the P wave color beam reflected at the display 22 is converted into the S wave.

The picture beam converted into the S wave at the display 22 is reflected at the split plane 30 of the polarization beam sprite prism 18, and directed to the projection lens 20. To do this, the split plane 30 of the polarization beam sprite prism 18 transmits the P wave, and reflects the S wave as shown in FIGS. 4A and 4B. Accordingly, the polarization beam sprite prism 18 transmits the P wave from the color switch 16, and reflects the S wave from the display 22 toward the projection lens 20.

In the meantime, as shown in FIG. 3B, the display 22 transmits the P wave color beam from the polarization beam sprite prism 18, as it is if there is an electrical signal applied thereto. Therefore, no beam of light is directed to the projection lens 20 when the electrical signal is applied to the display 22. The projection lens 20 enlarges the picture beam from the polarization beam sprite prism 18, and projects onto a screen at a distance therefrom.

However, the color switch 16 for splitting the color beam from the beams of lights in the related art image projector has a poor light efficiency caused by poor light transmission. For compensating such a disadvantage, a color wheel may be employed in place of the color switch 16.

However, for employing the color wheel in the related art image projector, an optical system that converges the beam of light and an optical system that diverges the beam of light again are required, additionally.

Moreover, the polarized beam converter in the related art image projector requires lens arrays each having a plurality of lenses. However, the lens arrays with the plurality of lenses cause optical losses between the lenses. The number of the lenses in the lens arrays may be reduced for reducing the optical loss, but that increases a thickness of the polarization array to push the cost up. Moreover, since an optical conversion efficiency is significantly dependent on an alignment of the lens arrays, assembly of the image projector requires much time.

In addition to this, the related art image projector has the lamp with the parabolic reflector for providing parallel beams to the polarized beam converter. The lamp with the parabolic reflector has an optical efficiency poorer than a lamp with an elliptic reflector as shown in FIG. 5.

The poor optical efficiency will be explained in detail assuming that a diameter of the parabolic reflector is Dp and a diameter of the elliptic reflector is De. The lamp with the parabolic reflector directs the beam of light forward in parallel, i.e., the parabolic reflector is required to have a slope for directing the beam from the lamp forward in parallel.

On the other hand, the lamp with an elliptic reflector directs the beam of light such that the beam is focused at a plane in front of the lamp. Accordingly, the elliptic reflector is required to have a slope greater than the parabolic reflector so that the beam from the lamp is focused on the plane in front of the lamp. That is, because the lamp with the elliptic reflector can reflect more beams, the lamp with the elliptic reflector has an optical efficiency higher than the lamp with the parabolic reflector.

If the lamp with the elliptic reflector and the lamp with the parabolic reflector have the same optical efficiency, the diameter of the elliptic reflector can be made smaller than the parabolic reflector, to reduce a size of the elliptic reflector. However, since the related art polarized beam converter requires a parallel light, the lamp with the elliptic reflector can not be employed, that limits fabrication of a thinner image projector.

SUMMARY OF THE INVENTION

Accordingly, the present invention is directed to an image projector that substantially obviates one or more of the problems due to limitations and disadvantages of the related art.

An object of the present invention is to provide an image projector which can improve an optical efficiency.

Another object of the present invention is to provide an image projector which permits fabrication of a thin image projector.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the image projector includes a lamp for emitting beams of lights, a color wheel for splitting particular color beams in succession from the beams of lights, a rod lens for making distribution of the color beams from the color wheel uniform, a polarized beam converter for converting the color beams into beams of a particular pole, an optical system for focusing the color beams converted into beams of a particular pole, a display for producing a picture beam of a video signal according to the video signal by using the color beams from the optical system, a polarization beam sprite prism between the optical system and the display for transmitting the color beams from the optical system and reflecting the picture beams from the display, and a projection lens for enlarging, and projecting the picture beams.

In another aspect of the present invention, there is provided an image projector including a lamp for emitting beams of lights, a color wheel for splitting particular color beams in succession from the beams of lights, a rod lens for making distribution of the color beams from the color wheel uniform, a polarized beam converter for converting the color beams into beams of a particular pole, an optical system for focusing the color beams converted into beams of a particular pole, a display for producing a picture beam of a video signal according to the video signal by using the color beams from the optical system, and a projection lens for enlarging, and projecting the picture beams.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 7:
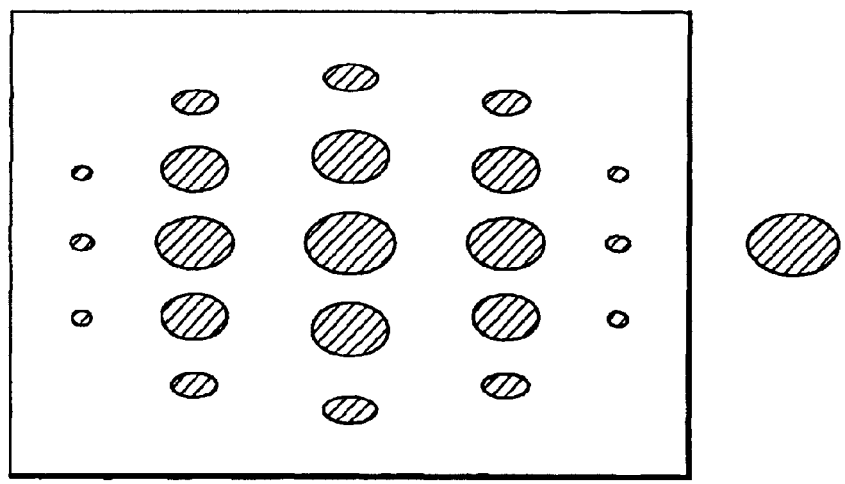
FIG. 7 illustrates a diagram of a distribution of beams focused by the illumination lenses in the image projector in FIG. 6.
Figure 8:
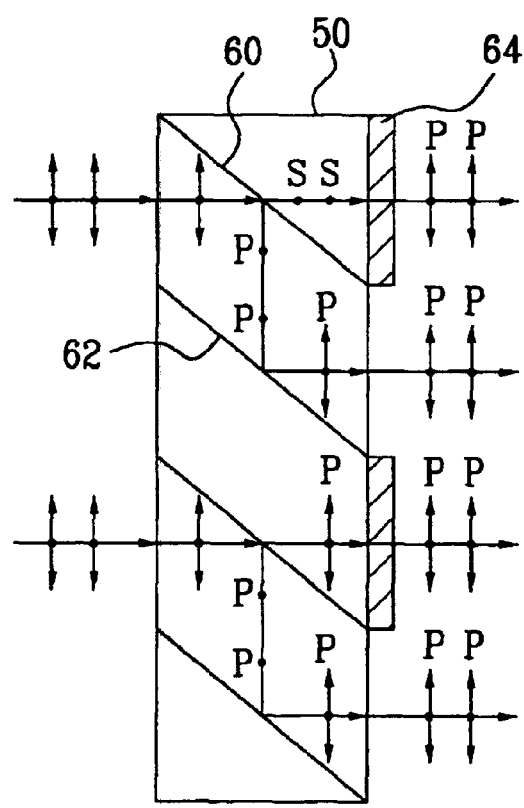
FIGS. 8 and 9 illustrate operation of the polarization beam sprite prism.
Figure 9:
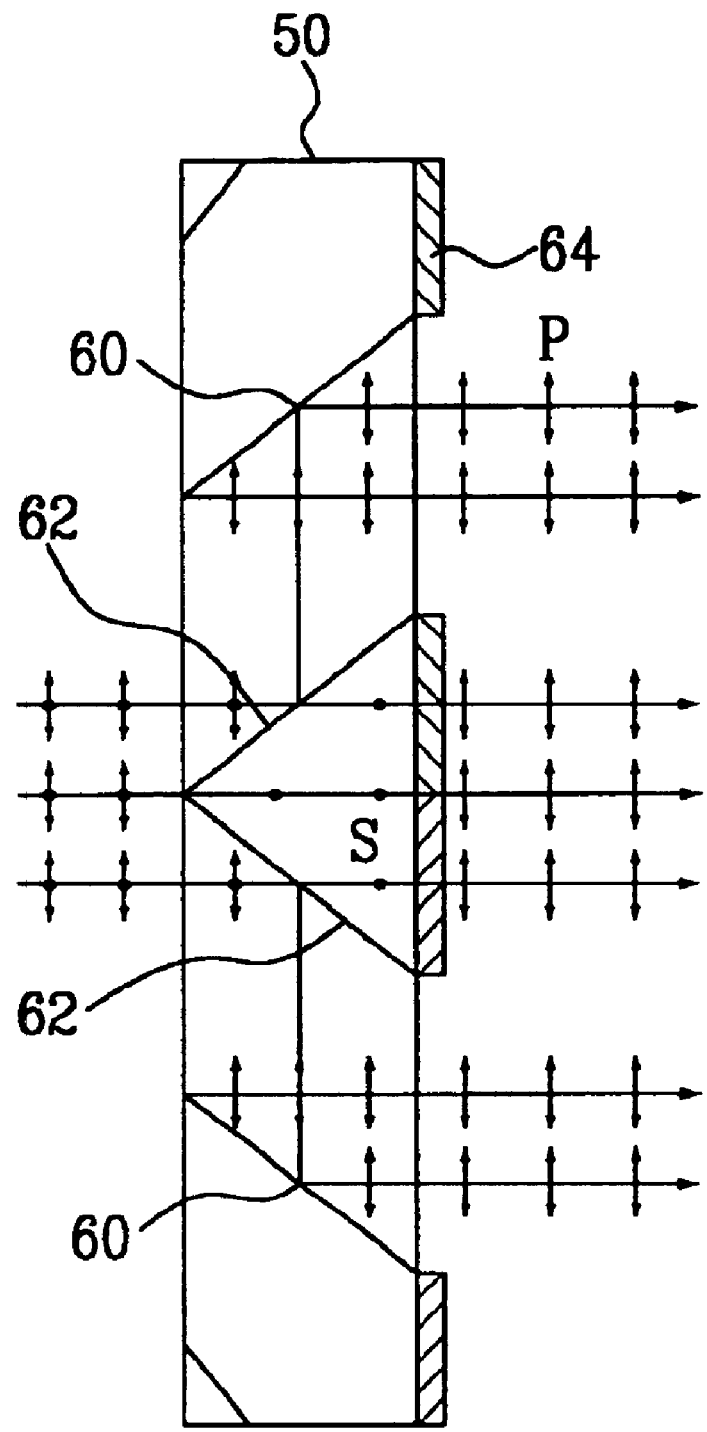
Figure 10:
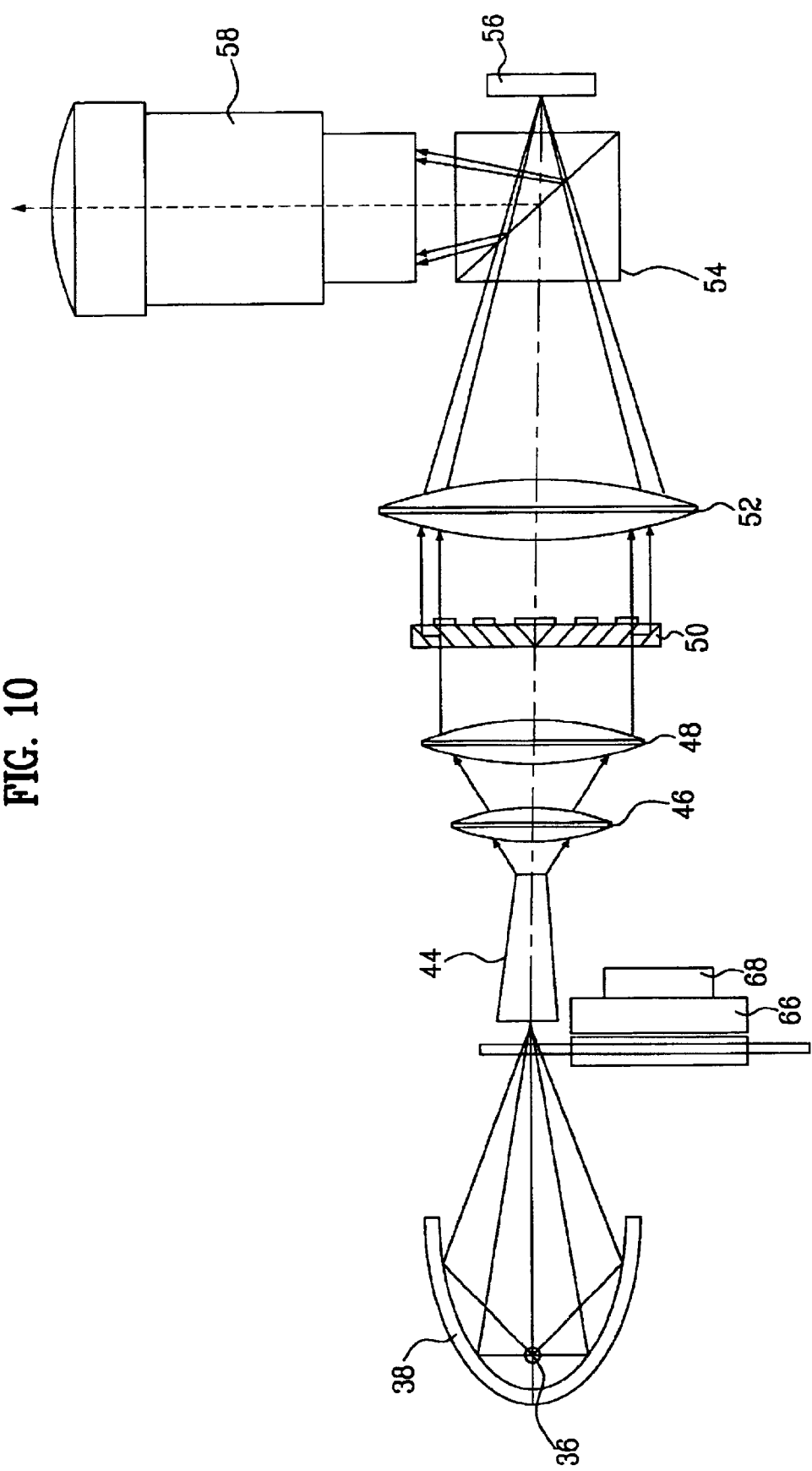
FIG. 10 illustrates a diagram of an image projector in accordance with a second preferred embodiment of the present invention.
Figure 11:
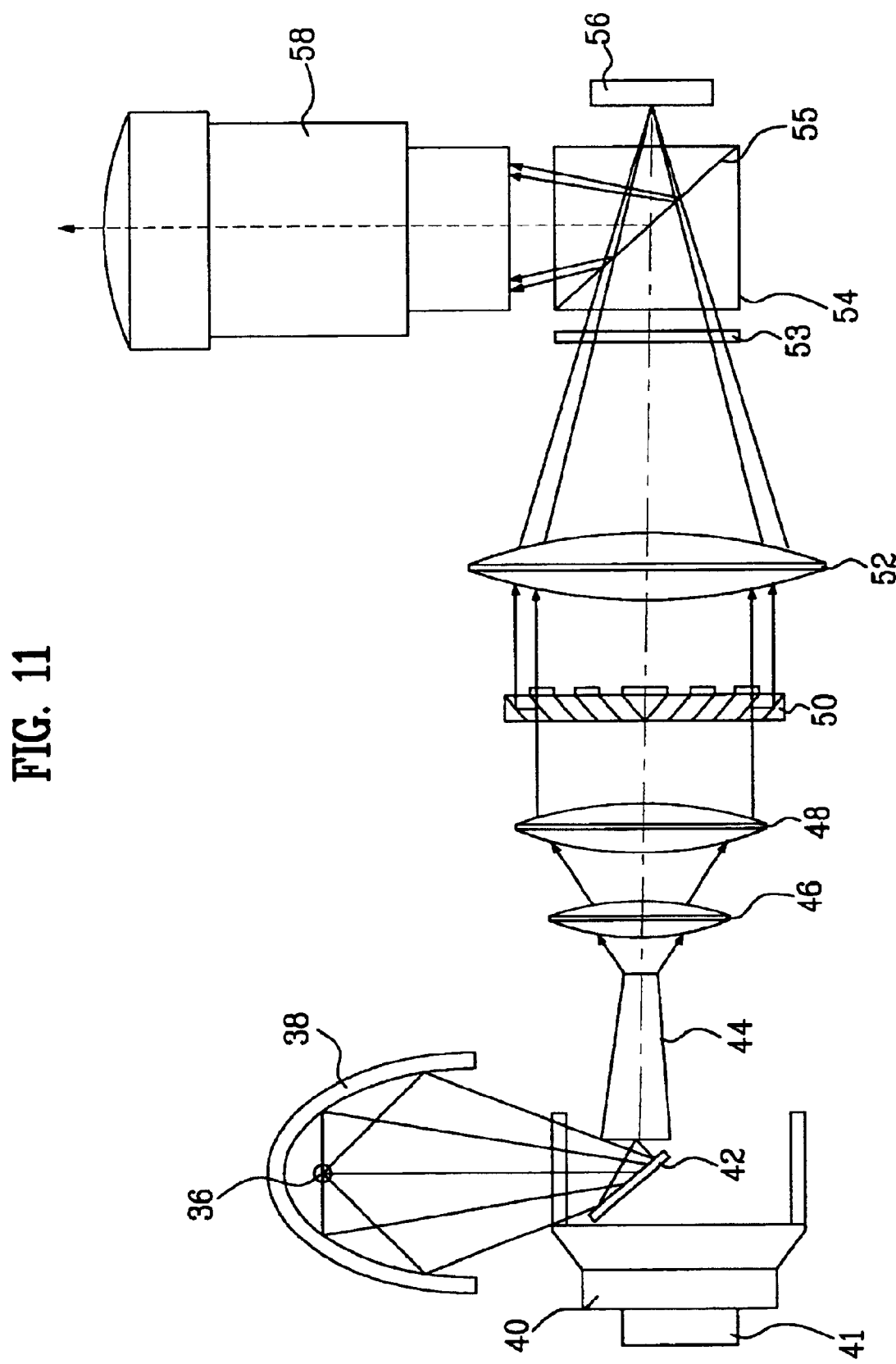
FIG. 11 illustrates a diagram of an image projector in accordance with a third preferred embodiment of the present invention.
Figure 12:
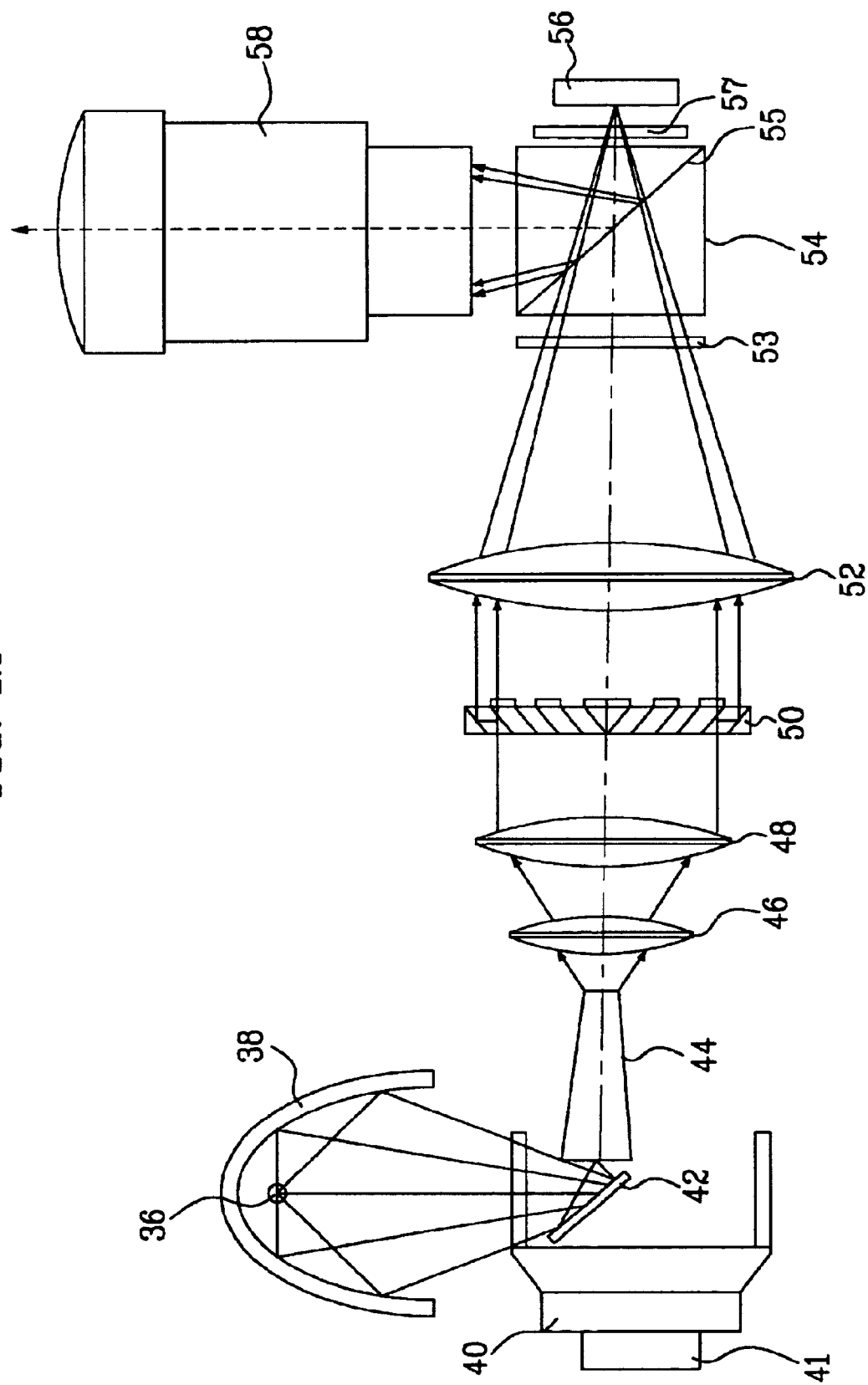
FIG. 12 illustrates a diagram of an image projector in accordance with a fourth preferred embodiment of the present invention.
Figure 13:
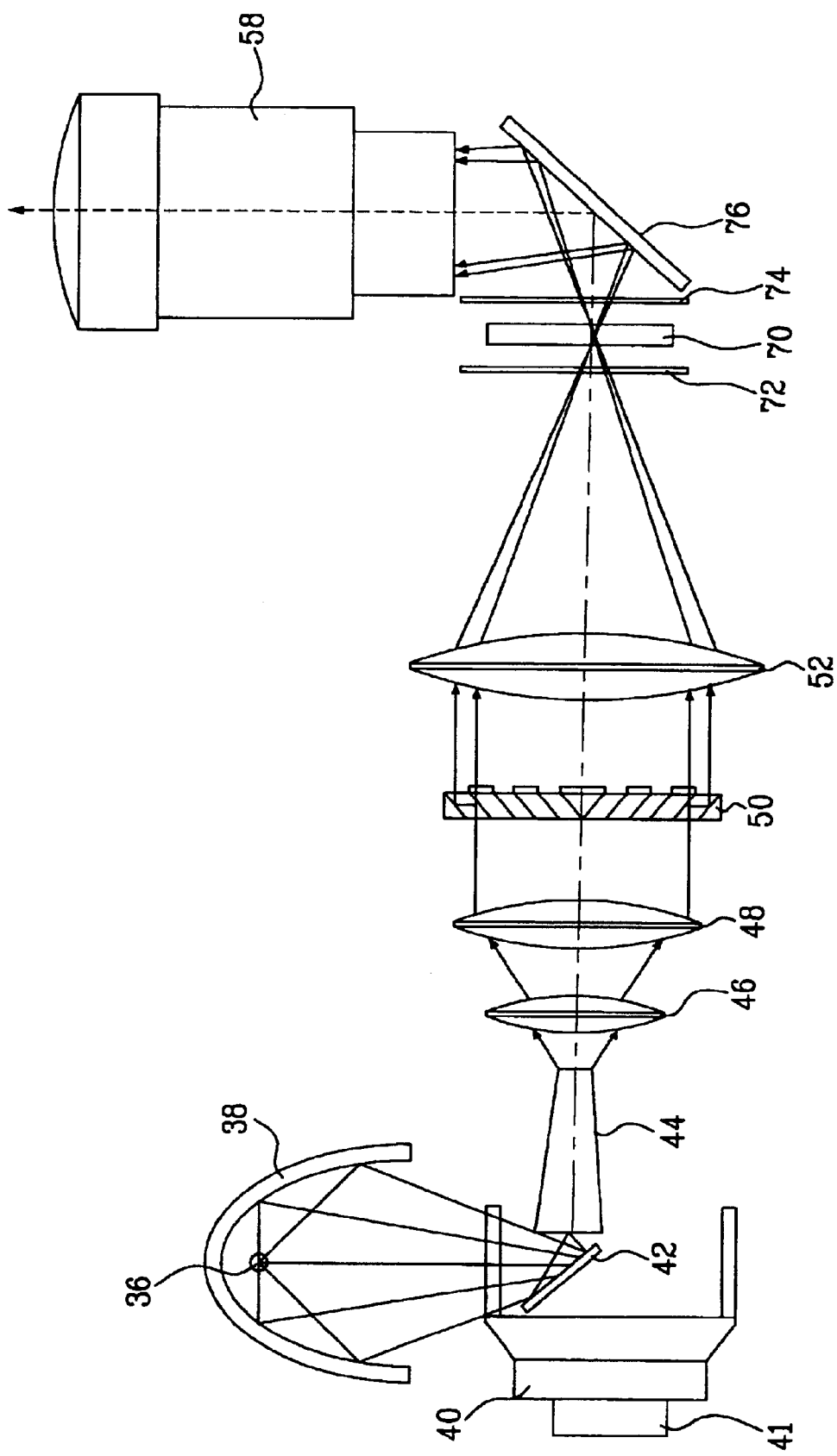
FIG. 13 illustrates a diagram of an image projector in accordance with a fifth preferred embodiment of the present invention.
Figure 14:
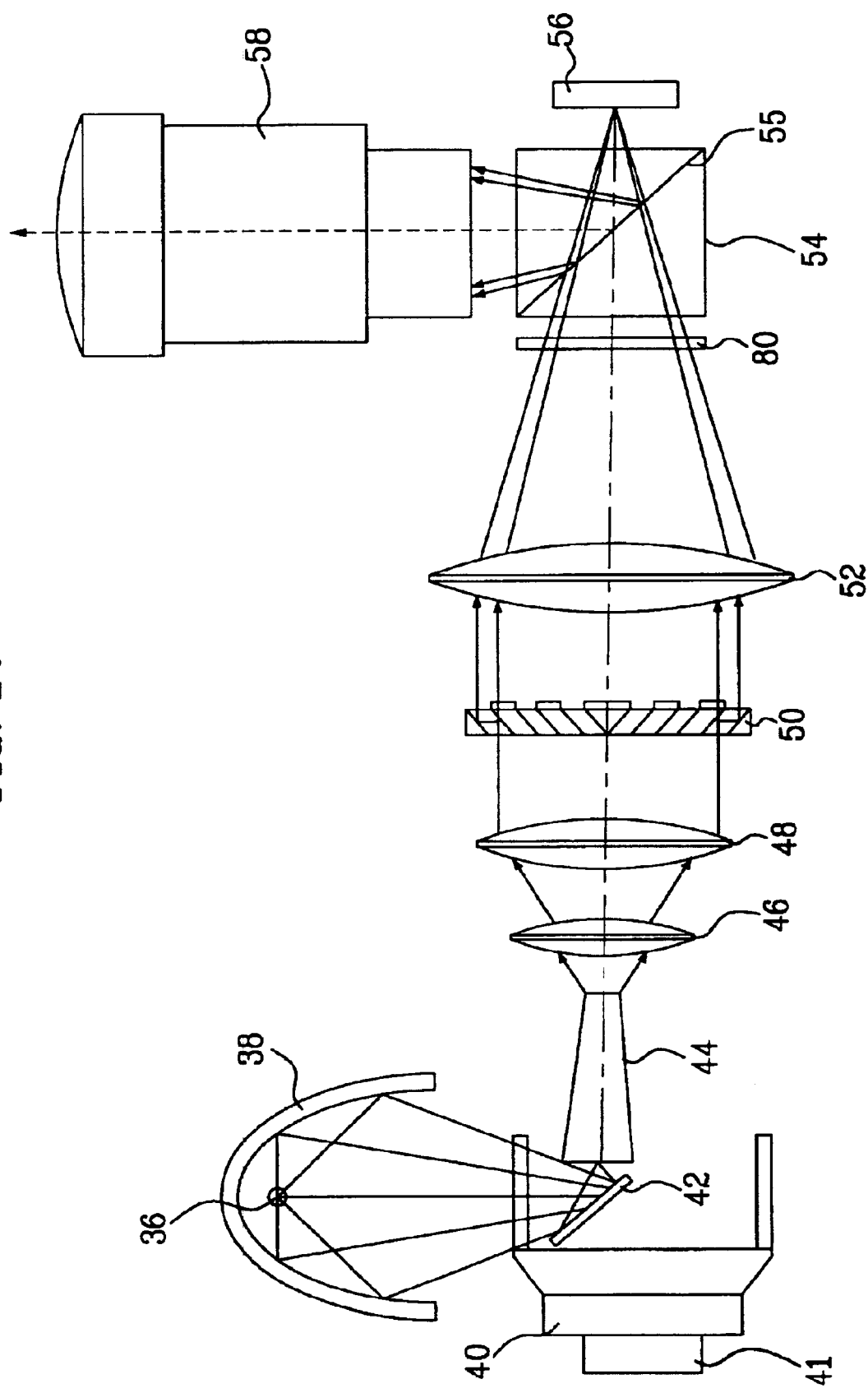
FIG. 14 illustrates a diagram of an image projector in accordance with a sixth preferred embodiment of the present invention.
Figure 15:
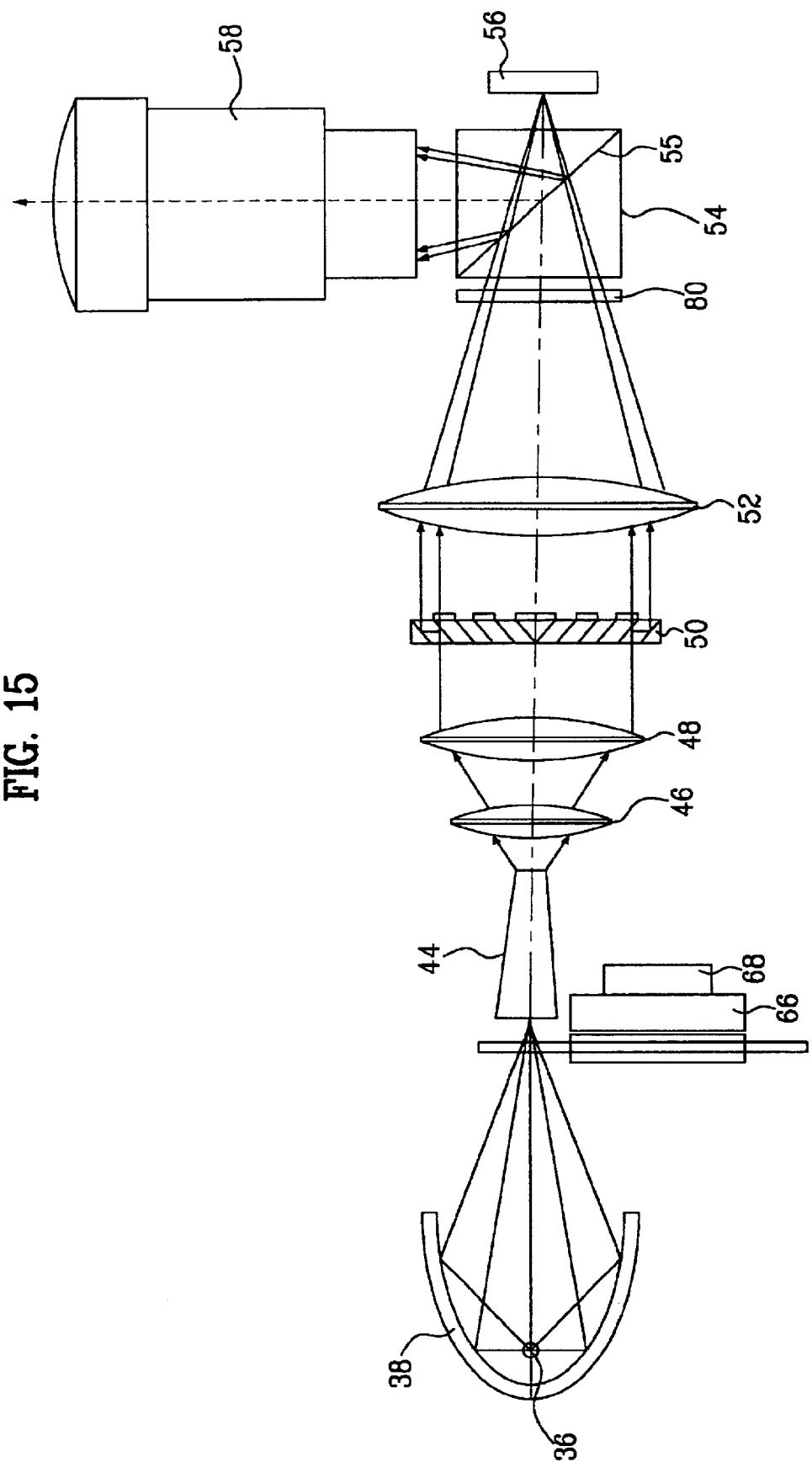
FIG. 15 illustrates a diagram of an image projector in accordance with a seventh preferred embodiment of the present invention.
Figure 16:
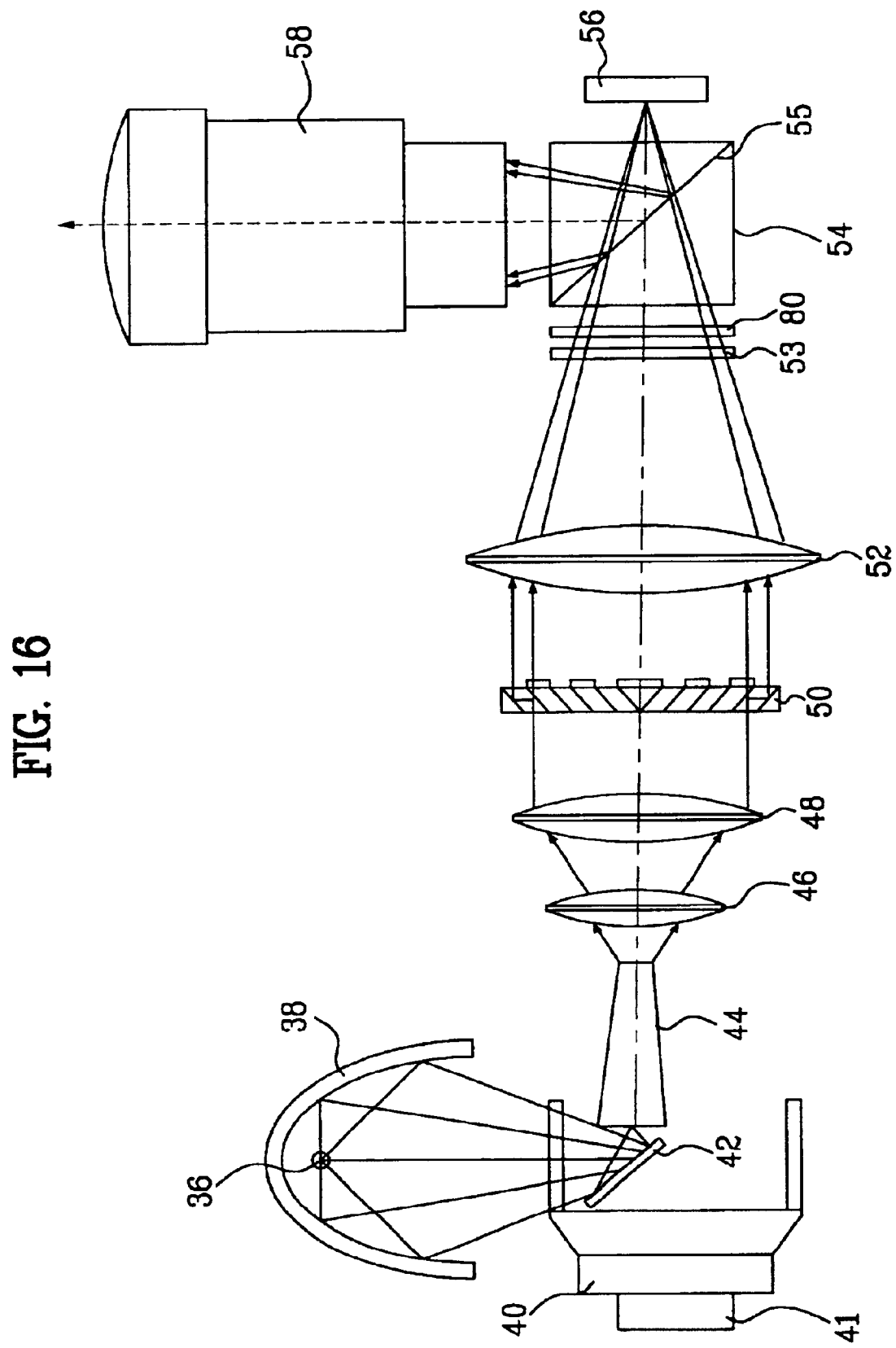
FIG. 16 illustrates a diagram of an image projector in accordance with a eighth preferred embodiment of the present invention; and, FIG. 17 illustrates a diagram of an image projector in accordance with a ninth preferred embodiment of the present invention.
Figure 17:
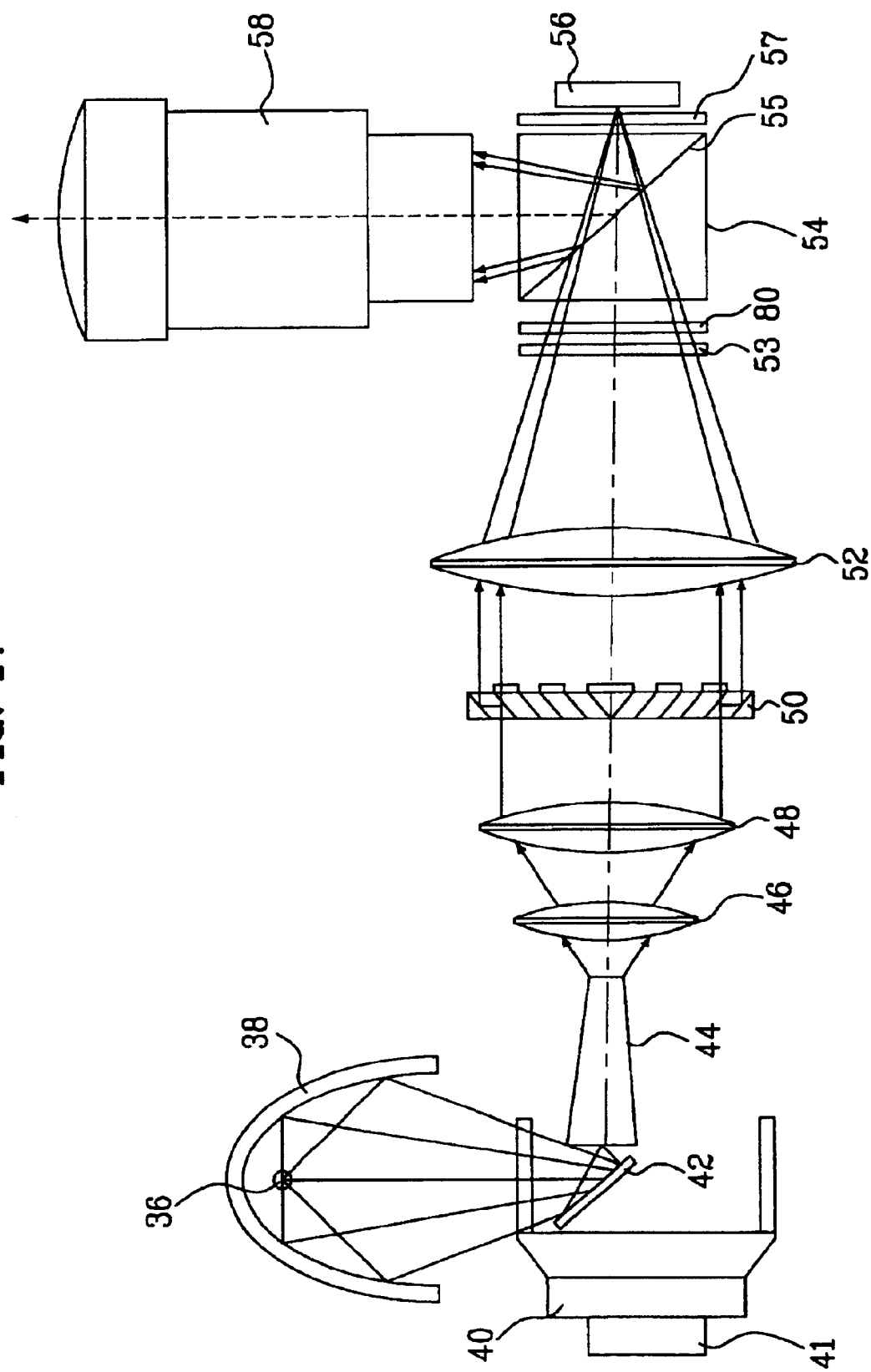

Reference will now be made in detail to the preferred embodiments of the present invention, examples of which are illustrated in the accompanying drawings FIGS. 6–17.
First Embodiment FIG. 6 illustrates a diagram of an image projector in accordance with a first preferred embodiment of the present invention, FIG. 7 illustrates a diagram of a distribution of beams focused by the illumination lenses in the image projector in FIG. 6, FIGS. 8 and 9 illustrate operation of the polarization beam sprite prism, FIG. 10 illustrates a diagram of an image projector in accordance with a second preferred embodiment of the present invention, FIG. 11 illustrates a diagram of an image projector in accordance with a third preferred embodiment of the present invention, FIG. 12 illustrates a diagram of an image projector in accordance with a fourth preferred embodiment of the present invention, FIG. 13 illustrates a diagram of an image projector in accordance with a fifth preferred embodiment of the present invention, FIG. 14 illustrates a diagram of an image projector in accordance with a sixth preferred embodiment of the present invention, FIG. 15 illustrates a diagram of an image projector in accordance with a seventh preferred embodiment of the present invention, FIG. 16 illustrates a diagram of an image projector in accordance with a eighth preferred embodiment of the present invention, and FIG. 17 illustrates a diagram of an image projector in accordance with a ninth preferred embodiment of the present invention.

Figure 6:
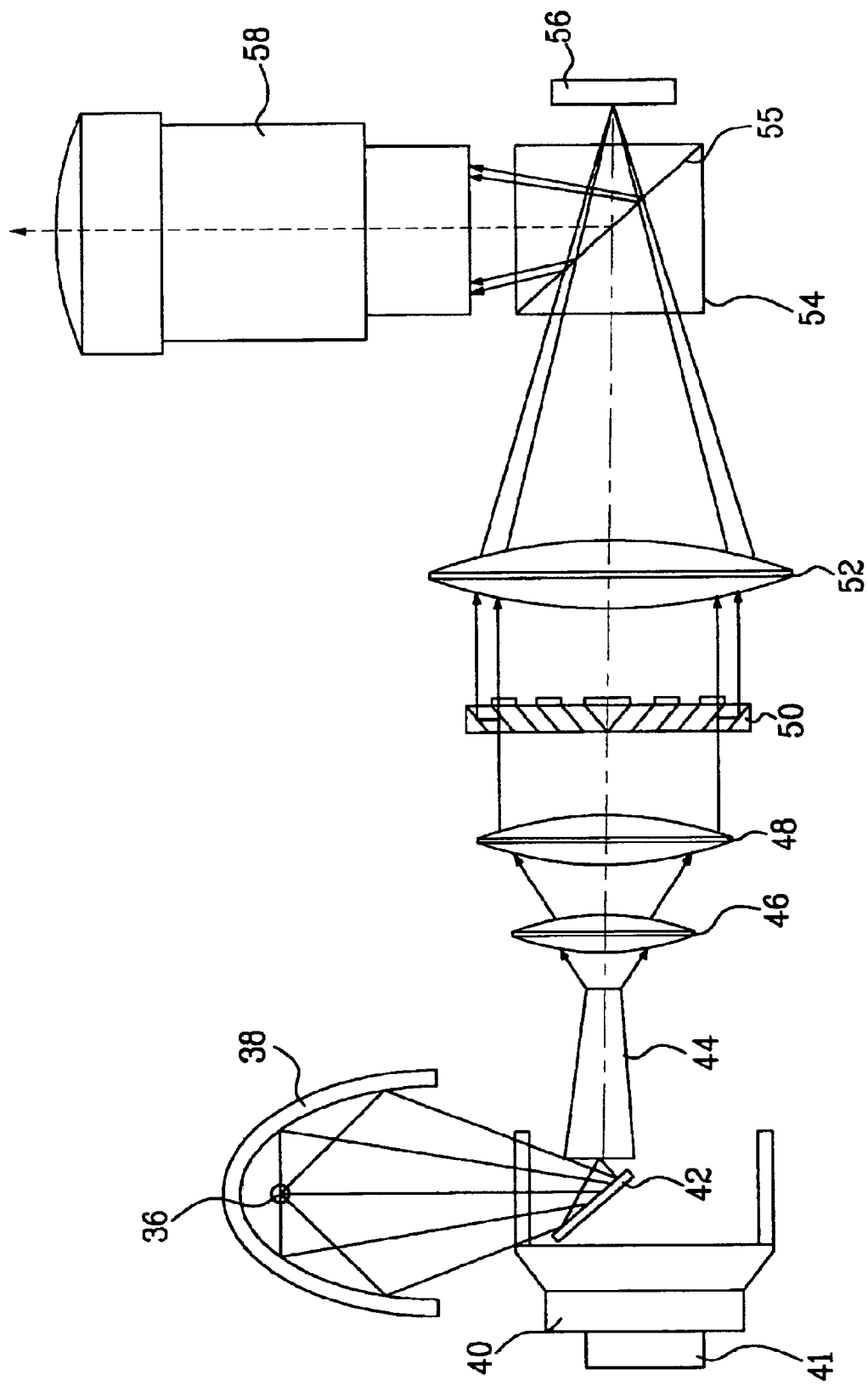
FIG. 6 illustrates a diagram of an image projector in accordance with a first preferred embodiment of the present invention.

Referring to FIG. 6, the image projector in accordance with a first preferred embodiment of the present invention includes a lamp 36 for emitting beams of lights, an elliptic reflector 38 for reflecting the beams to forward of the lamp 36, a cylindrical color wheel 40 for transmitting a particular color beam among the beams of lights, a mirror 42 for deflecting a path of the color beam passed through the cylindrical color wheel 40, a rod lens 44 for making a distribution of the color beams from the mirror uniform, a polarized beam converter for converting the color beams from the rod lens 44 into beams of a particular pole, an illumination lens 52 for focusing the color beams converted into the particular pole at the polarized beam converter, and a polarization beam sprite prism 54 for supplying a color beam from the illumination lens 52 to the display 56 and beams transmitted from the display 56 to the projection lens 58.

As explained, the display 56 transmits the color beams supplied from the polarization beam sprite prism 54 according to a video signal, to display a picture, and the projection lens 58 enlarges a beam of the picture from the display 56, and projects onto a screen at a distance.

The beam of light from the lamp 36 is focused onto the cylindrical color wheel 40 by the elliptical reflector 38. The cylindrical color wheel transmits red, green, and blue beams of colors as the cylindrical color wheel rotates by a driving power of a motor 41. The beams color split by the cylindrical color wheel 40 are totally reflected at a mirror 42 and incident on the rod lens 44.

The rod lens 44 makes the beams uniform so that the beam is distributed on the screen, uniformly. That is, a distribution of the beam entered into the rod lens 44 is made uniform by total reflection in the rod lens 44.

The polarized beam converter converts the beams from the rod lens 44 into beams of a particular pole, and transmits the converted beams. To do this, the polarized beam converter includes a second illumination lens 46, and a third illumination lens 48 for focusing the beams from the rod lens 44 onto a particular location, and a polarization beam sprite array 50 facing an optical output surface of the third illumination lens 48.

Referring to FIG. 7, the second illumination lens 46 and the third illumination lens 48 focus the beams from the rod lens 44 onto a plurality of focusing dots. Thus, in order to focus the beams onto the plurality of focusing dots by the second illumination lens 46 and the third illumination lens 48 efficiently, an area of the optical output surface of the rod lens 44 is required to be equal to, or smaller than an area of an optical input surface as expressed in the following inequality (1).

$$\text{An area of an optical input surface} \geq \text{an area of an optical output surface} \quad (1)$$

When the area of the optical output surface of the rod lens 44 is smaller than the area of the optical input surface, a degree of beam split is improved. The beams focused onto the plurality of focus dots by the second illumination lens 46 and the third illumination lens 48 are incident on the polarization beam sprite array 50.

The polarization beam sprite array 50 converts the beam from the third illumination lens 48 into beams of a particular pole, and forwards. To do this, as shown in FIG. 8, the polarization beam sprite array 50 has polarization beam split planes 60 and polarization beam reflection planes 62, and half wavelength plates 64 attached to an optical output surface of the polarization beam split planes 60.

The polarization beam split plane 60 transmits the P wave only, and reflects the S wave among the beams from the third illumination lens 48. The P wave passed through the polarization beam split plane 60 is converted into the S wave by the half wavelength plate 64. On the other hand, the S wave reflected at the polarization beam split plane 60 is reflected at the reflection plane 62, and forwarded. All the beams inclusive of the P wave passed through the polarization beam sprite array 50 and the S wave are converted into the S wave.

Figure 1:
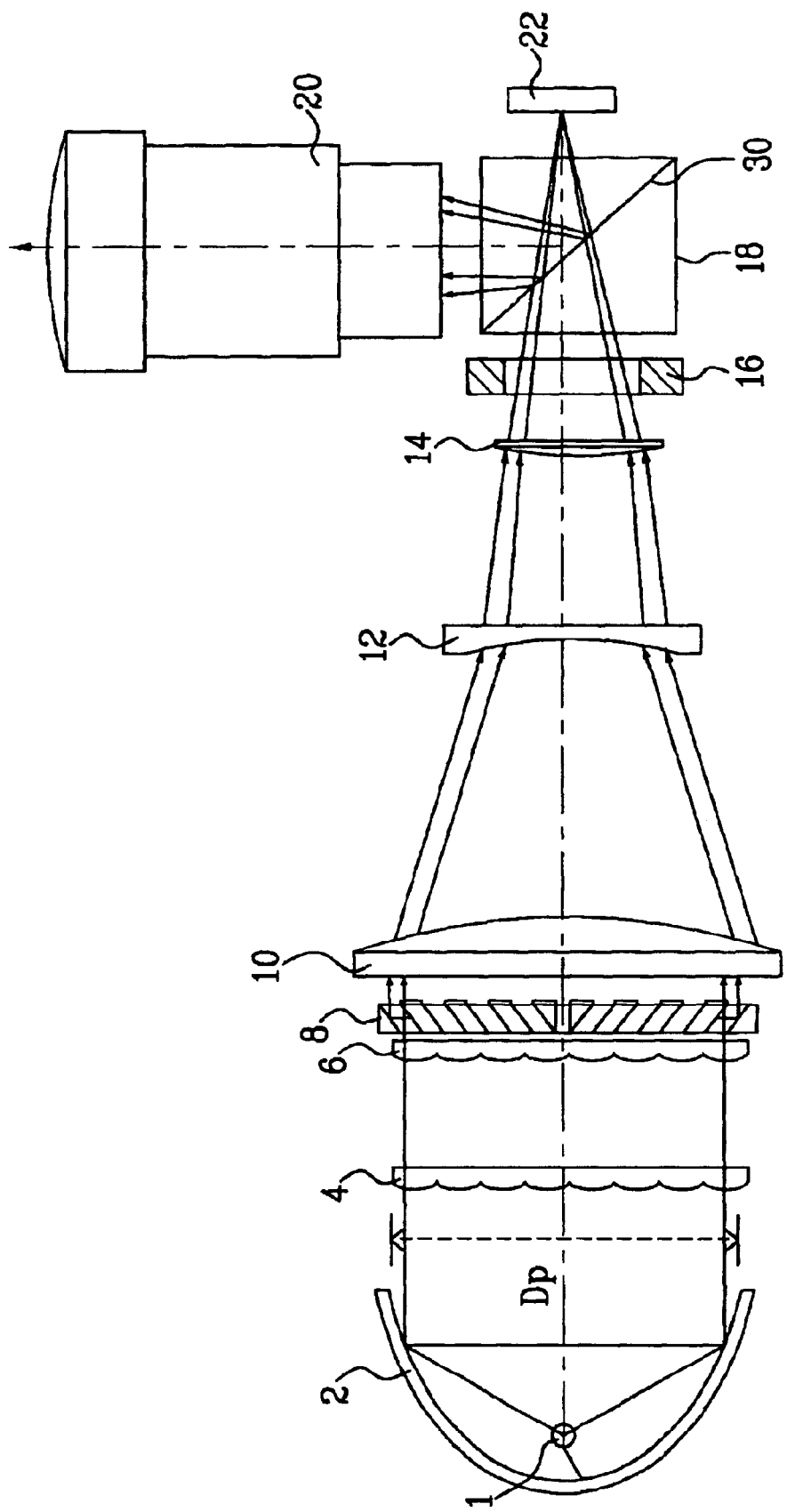
FIG. 1 illustrates a diagram of a related art image projector.
Figure 2:
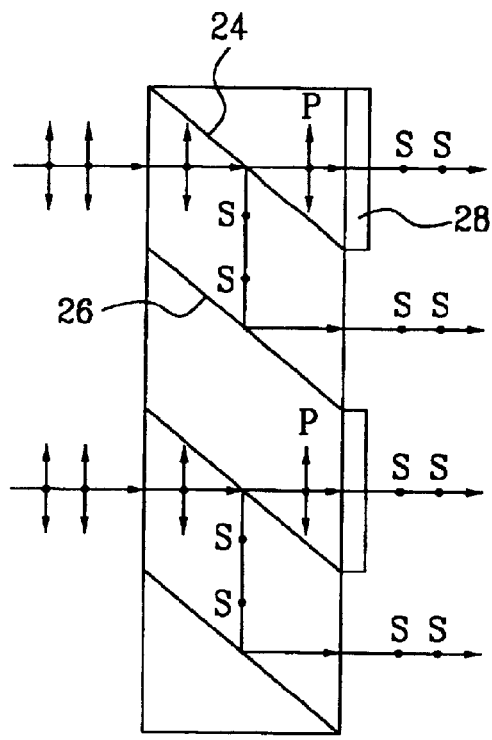
FIG. 2 illustrates a diagram showing operation of the polarization beam sprite array in the image projector in FIG. 1.
Figure 3A:
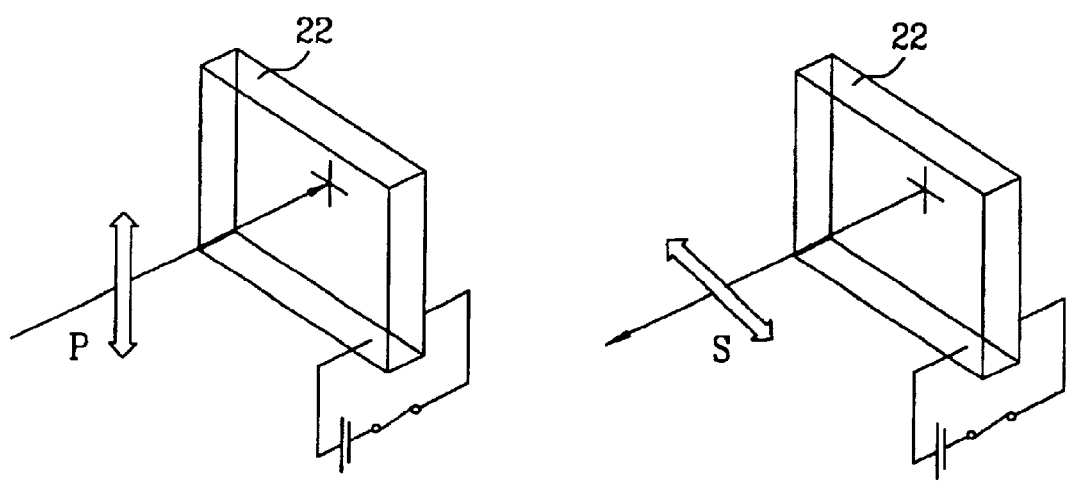
FIGS. 3A and 3B illustrate diagrams showing operation of the image projector in FIG. 1.
Figure 3B:
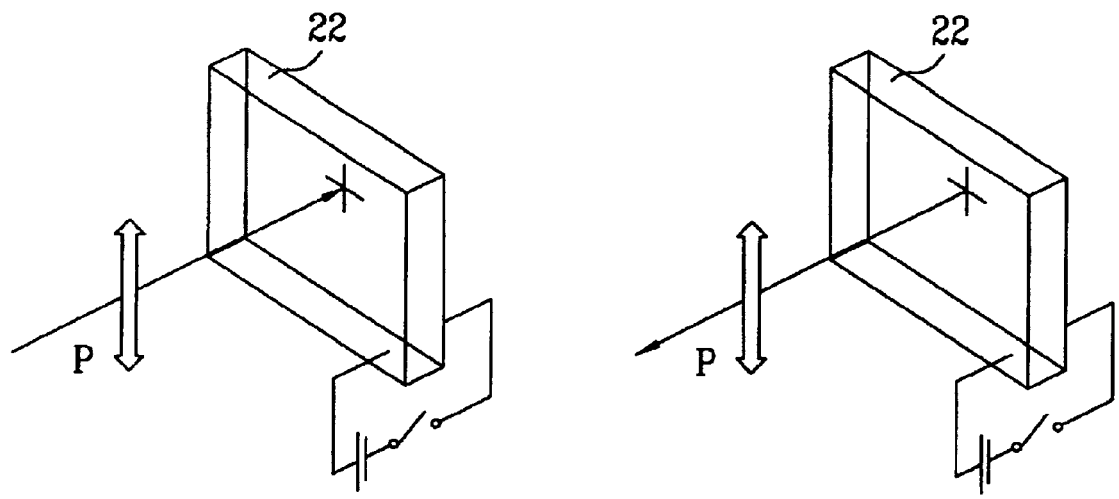
Figure 4A:
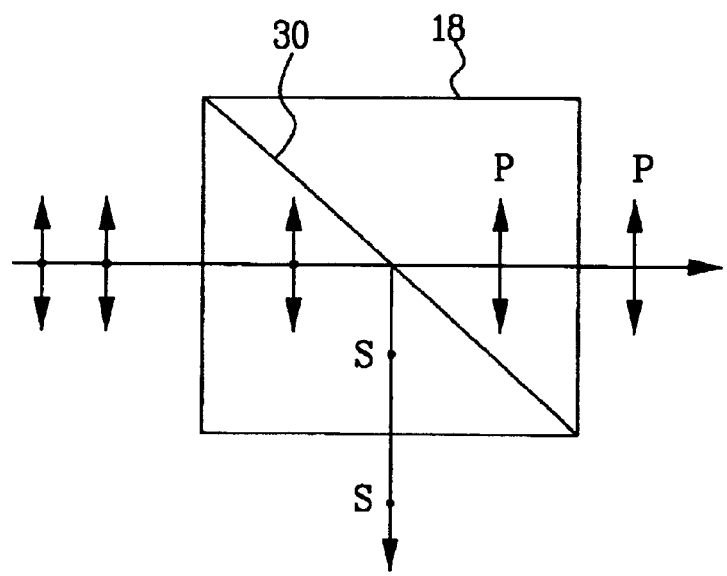
FIGS. 4A and 4B illustrate diagrams showing operation of the polarization beam sprite prism in the image projector in FIG. 1.
Figure 4B:
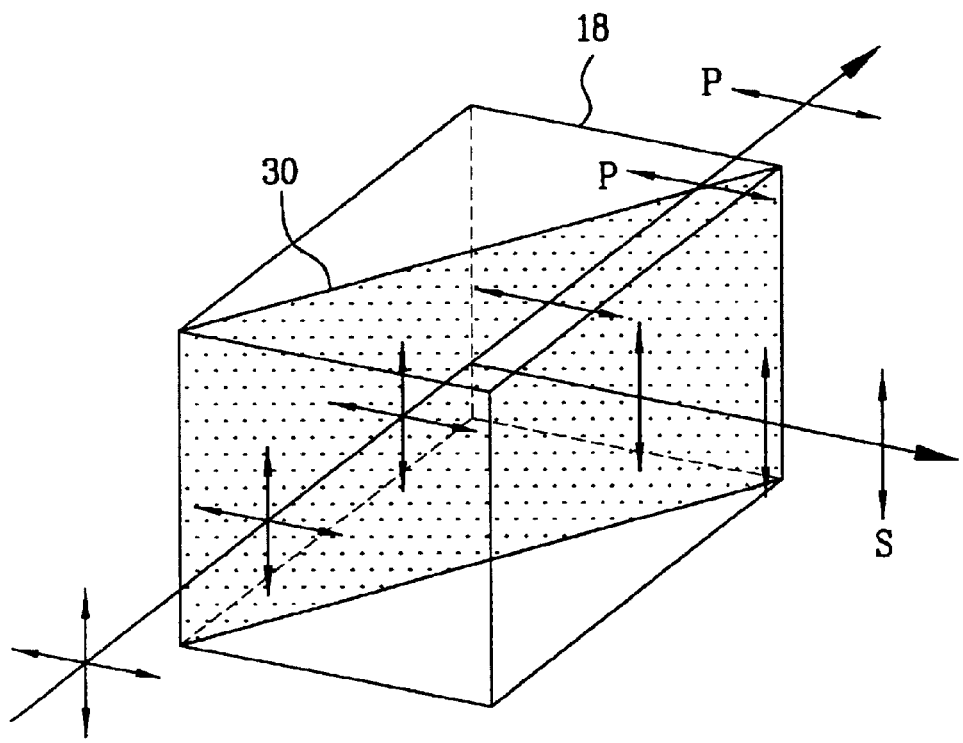
Figure 5:
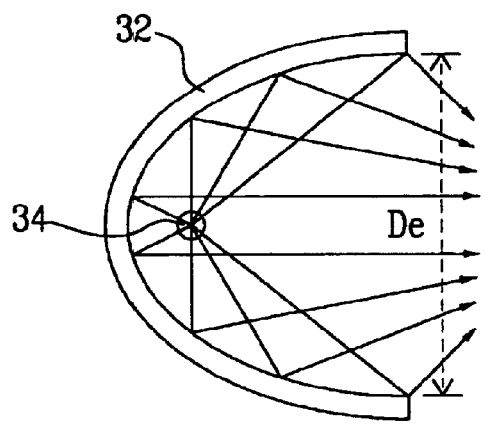
FIG. 5 illustrates a diagram of a lamp with an elliptic reflector.

On the other hand, the polarization beam sprite array 50 may also convert all the beams into the P wave the same with the related art polarization beam sprite array shown in FIG. 2.

Moreover, as shown in FIG. 7, the beams from the third illumination lens 48 are concentrated to a central part. Accordingly, as shown in FIG. 9, two polarization beam split planes in a form of a triangle are provided in the center part of the polarization beam sprite array 50.

The beams converted into the P wave at the polarization beam sprite array 50 are incident on the polarization beam sprite prism 54 by the first illumination lens 52. The beams of the S wave from the first illumination lens 52 to the polarization beam sprite prism 54 are reflected at the split plane 55, and incident on the display 56.

The display 56 produces a picture beam with picture information by reflecting the beams of the S wave reflected at the polarization beam sprite prism 54 and incident thereon according to the video signal. In this instance, the beams of S wave reflected at the display 56 are converted into the P wave by an electrical signal. The picture beams converted into the P wave at the display 56 transmit the split plane 55 in the polarization beam sprite prism 54, and incident on the projection lens 58.

In this instance, if the beams are not converted into the P wave at the display by the electrical signal, i.e., if there is no electrical signal applied to the display 56, the polarization beam sprite prism 54 reflects the beams from the display 56. Thus, the incidence of the beams on the projections lens 58 is dependent on application of the electrical signal to the display 56.

The projection lens 58 enlarges the picture beam from the polarization sprite prism 18, and projects to a screen at a distance. On the other hand, if there are the beams of P wave from the polarization beam sprite array 50, there are half wavelength plates (not shown) between the polarization beam sprite array 50 and the polarization beam sprite prism 55, additionally.

The half wavelength plate between the polarization beam sprite array 50 and the polarization beam sprite prism 55 converts the P wave from the polarization bean sprite array 50 into the S wave.

Second Embodiment

In the meantime, referring to FIG. 10, in place of the drum form of cylindrical color wheel 40, a disk type color wheel may be employed. The disk type color wheel 66 transmits red, green, and blue color beams in succession as the disk type color wheel 66 is rotated by a driving force of the motor 68. Operation of the disk type color wheel is the same with the first embodiment shown in FIG. 6.

Third Embodiment

FIG. 11 illustrates a diagram of an image projector in accordance with a third preferred embodiment of the present invention.

Referring to FIG. 11, the image projector in accordance with a third preferred embodiment of the present invention includes a polarization plate 53 between the first illumination lens 52 and the polarization prism 54. The polarizing plate 53 transmits only a beam of a particular pole from the first illumination lens 52. That is, the polarizing plate 53 removes noise beam of which polarization conversion is not done perfectly. The removal of the noise beam from the polarizing plate 53 improves contrast of the image projector.

Fourth Embodiment

Referring to FIG. 12, a ¼ wavelength plate 57 may be provided between the polarization sprite prism 54 and the display 56 additionally, for preventing distortion of a polarized beam component of the beams transmitted through the polarization beam sprite prism 54, thereby improving contrast.

Fifth Embodiment

FIG. 13 illustrates a diagram of an image projector in accordance with a fifth preferred embodiment of the present invention, wherein a transmission type display is provided.

Referring to FIG. 13, the image projector in accordance with a fifth preferred embodiment of the present invention further includes the transmission type display 70, polarization plates 72, and 74 fitted in front, and rear of the transmission type display 70, and a mirror 76 for directing the beams passed through the transmission type display 70 to the projection lens 78, in addition to the system of the first embodiment.

The transmission type display 70 receives beams of the lights from the first illumination lens 52, and transmits the beams therethrough according to a video signal, for producing a picture beam loaded with picture information. The polarizing plate 72 in front of the transmission type display only transmits a beam of particular pole among the beams from the first illumination lens 52, and the polarizing plate 74 in rear of the transmission type display 70 only transmits a beam of a particular pole among the picture beam from the transmission type display 70.

That is, the picture beam passed through the polarizing plate 74 is incident on the mirror 76, and the mirror 76 supplies the picture beam supplied thereto to the projection lens 78.

Sixth Embodiment

FIG. 14 illustrates a diagram of an image projector in accordance with a sixth preferred embodiment of the present invention.

Referring to FIG. 14, the image projector includes a half wavelength plate 80 fitted between the first illumination lens 52 and the polarization beam sprite prism 54. The half wavelength plate 80 converts the S wave from the illumination lens 52 into the P wave. That is, the converted P wave is incident on the polarization beam sprite prism 54, transmits the split plane 55, and is directed to the display 56. According to an electric characteristic of the display 56, the P wave incident on the display 56 is converted into the S wave, reflected at the polarization beam sprite prism 54 and the split plane 55, and incident on the projection lens, or the P wave not converted into the S wave transmits the split plane 55, not being incident on the projection lens 58.

Seventh Embodiment

The present invention may employ a disk type color wheel 66 as shown in FIG. 15 in place of the cylindrical color wheel of a drum form.

The disk type color wheel 66 transmits red, green, and blue color beams in succession as the motor 68 rotates the color wheel 66. Other operations of the seventh embodiment projector are identical to the sixth embodiment explained in association with FIG. 14.

Eighth Embodiment

FIG. 16 illustrates a diagram of an image projector in accordance with an eighth preferred embodiment of the present invention.

Referring to FIG. 16, the image projector includes a polarizing plate 53 fitted between the first illumination lens 52 and the half wavelength plate 80. The polarizing plate 53 transmits a beam of a particular pole among the beams from the first illumination lens 52. That is, the polarizing plate 53 removes noise beams which are not converted into polarized beams at the illumination system, perfectly. The removal of the noise beams at the polarizing plate 53 improves a contrast of the projector.

Ninth Embodiment

Referring to FIG. 17, the projector of the present invention may have a ¼ wavelength plate 57 between the polarization beam sprite prism 54 and the display 56 additionally, for preventing distortion of a polarized beam component of the beams transmitted through the polarization beam sprite prism 54, thereby improving a contrast.

The projectors of the foregoing embodiments of the present invention permit to employ the lamp with the elliptic reflector because the rod lens requires focusing of beams thereon, thereby providing an optical efficiency higher than the related art projector, and permitting to fabricate a projector thinner than the related art.

Moreover, the projector of the present invention permits to improve an optical efficiency of the projector, and fabricate a projector thinner than the related art because the beams are focused onto the rod lens that permits addition of a color wheel without addition of other optical system. Furthermore, the focusing of beams by using the illumination lenses only without the lens array used in the related art permits to prevent the optical loss from the lens array.

It will be apparent to those skilled in the art that various modifications and variations can be made in the image projector of the present invention without departing from the spirit or scope of the invention. Thus, it is intended that the present invention cover the modifications and variations of this invention provided they come within the scope of the appended claims and their equivalents.

What is claimed is:

1. An image projector comprising:
   a light source having an elliptical reflector;
   a color filter that transmits a predetermined beam of light of a predetermined wavelength from beams of light focused from the light source;
   a reflective plate that reflects the predetermined beam of light transmitted through a color filter;
   a rod lens that converges the predetermined beam of light from the reflective plate to make a distribution of the predetermined beam of light uniform;
   a first illumination lens part that diverges the predetermined beam of light of a uniform distribution from the rod lens, and focuses the predetermined beam of light onto a plurality of focusing points;
   a polarization beam sprite array that polarizes the predetermined beam of light from the first illumination lens in a predetermined direction;
   a second illumination lens part that focuses the polarized beam of light from the polarization beam sprite array;
   a polarization prism having a polarization split plane for transmitting or reflecting the focused beam of light;
   a reflection type display for producing a picture beam according to a video signal by using a reflected beam of light; and
   a projections lens for enlarging and projecting the picture beam.

2. An image projector as claimed in claim 1, wherein the color filter is a cylindrical color wheel having a plurality of color filters integrated into a cylinder form.

3. An image projector as claimed in claim 1, wherein the color filter is a disk type color wheel having a plurality of color filters integrated into a disk form.

4. An image projector as claimed in claim 1, wherein the rod lens is tapered from an optical input surface to an optical output surface.

5. An image projector as claimed in claim 1, wherein the polarization beam sprite array receives beams inclusive of a P wave and a S wave, and transmitting the S wave and converting the P wave into the S wave transmitting the converted S wave.

6. An image projector as claimed in claim 1, wherein the polarization beam sprite array receives beams inclusive of a P wave and an S wave, and transmitting the P wave and converting the S wave into a P wave and transmitting the converted P wave.

7. An image projector as claimed in claim 6, further comprising a half wavelength plate between the polarization beam sprite array and the polarization prism for converting the S wave into the P wave, or vice versa.

8. An image projector as claimed in claim 1, further comprising a polarizing plate between the second illumination lens part and the polarization beam sprite prism for removing noise beams.

9. An image projector as claimed in claim 1, further comprising:
   a ¼ wavelength plate between the polarization beam sprite prism and the display;
   a polarizing plate between the polarization beam sprite prism and ¼ wavelength plate; and
   a ½ wavelength plate between the polarizing plate and the ¼ wavelength plate.

10. An image projector comprising:
    a light source having an elliptical reflector;
    a color filter that transmits a particular beam of light from beams of light focused from the light source;
    a reflective plate that reflects the particular beam of light of a wavelength transmitted through the color filter;
    a rod lens that converges the beam of light from the reflective plate to make a distribution of beam uniform;
    a fist illumination lens part that diverges the beam of light of a uniform distribution from the rod lens, and focuses the beam of light onto a plurality of focusing points;
    a polarization beam sprite array that polarizes the beam of light from the first illumination lens in particular direction;
    a transmission-type display that produces a picture beam according to a video signal using a polarization split beam of light; and
    a projection lens for enlarging, and projecting the picture beam.

11. An image projector as claimed in claim 10, wherein the display includes polarizing plates fitted in front and rear of the display.

12. An image projector as claimed in claim 10, further comprising a mirror between the display and the projection lens for direction the picture beams supplied from the display to the projection lens.

13. An image projector as claimed in claim 10, wherein the color filter is a cylindrical color wheel having a plurality of color filters integrated into a cylinder form.

14. An image projector as claimed in claim 10, wherein the color filter is a disk type color wheel having a plurality of color filters integrated into a disk form.

* * * * *